(12) United States Patent
Mazzitelli

(10) Patent No.: US 7,653,741 B2
(45) Date of Patent: Jan. 26, 2010

(54) METHOD AND APPARATUS FOR PROCESSING SYSTEM MANAGEMENT MESSAGES

(75) Inventor: John J. Mazzitelli, Marlton, NJ (US)

(73) Assignee: Red Hat, Inc., Raleigh, NC (US)

( * ) Notice: Subject to any disclaimer, the term of this patent is extended or adjusted under 35 U.S.C. 154(b) by 334 days.

(21) Appl. No.: 11/712,282

(22) Filed: Feb. 27, 2007

(65) Prior Publication Data

US 2008/0209023 A1 Aug. 28, 2008

(51) Int. Cl.
*G06F 15/16* (2006.01)
(52) U.S. Cl. ........................ 709/235; 709/223
(58) Field of Classification Search ............ 709/223, 709/235; 710/35
See application file for complete search history.

(56) References Cited

U.S. PATENT DOCUMENTS

| | | | |
|---|---|---|---|
| 6,363,421 B2* | 3/2002 | Barker et al. ............... | 709/223 |
| 6,795,864 B2* | 9/2004 | Connor ....................... | 709/232 |
| 2002/0120730 A1* | 8/2002 | Goudzwaard et al. ....... | 709/223 |
| 2003/0135639 A1* | 7/2003 | Marejka et al. ............. | 709/232 |
| 2003/0195922 A1* | 10/2003 | Andrews et al. ............ | 709/202 |

OTHER PUBLICATIONS

Roeck, Cable Modem Management Information Base for MCNS compliant Cable Modems, Jul. 1997.*

* cited by examiner

*Primary Examiner*—Nathan Flynn
*Assistant Examiner*—James E Conaway
(74) *Attorney, Agent, or Firm*—Blakely, Sokoloff, Taylor & Zafman LLP

(57) ABSTRACT

Method and apparatus for processing system management messages are described herein. In one embodiment, a throttling policy associated with a network node is determined for throttling system management messages to be sent to a system management server over a network. The system management messages are then sent to the system management server according to the throttling policy, where the system management server is configured to manage multiple network nodes over the network. Other methods and apparatuses are also described.

22 Claims, 9 Drawing Sheets

METHOD AND APPARATUS FOR PROCESSING SYSTEM MANAGEMENT MESSAGES

FIELD

The present invention relates generally to system management. More particularly, this invention relates to processing system management messages.

BACKGROUND

Enterprise computing systems and networked enterprise computing systems continue to grow in scale and in the complexity of their components and interactions. Today's large-scale networked enterprise computing systems and services exhibit complex behaviors stemming from the interaction of workload, software structure, hardware, network traffic conditions, and system goals, such as service level objectives and agreements. Because of this considerable growth in both scale and complexity, system and/or network management issues become complicated.

Typically, a systems management product is employed within a network. Its purpose is to administer and monitor different servers running on the network. For example, a system management application can watch an application server or Web server and can tell things like how much memory they are using, whether one crashed and went down or if the server is up and running normally, etc.

There are typically two main components in a system management product: a system management server component and an agent component. A server component is installed at a server while an agent component is installed at clients of the network. An agent is responsible for monitoring software running on its computer. When an agent has detected new information about the software it is monitoring, it sends data to the system management server. Therefore, all agents in the network need to send messages to the server.

As a network grows, there may be hundreds or thousands of agents running and there is only one server. If all the agents send data to the server at once, either the server will get flooded with messages and cannot handle it or alternatively, one or more agents will starve (e.g., not be able to send messages to the server because other agents are taking up all the server's time).

One typical solution is to build a cluster of redundant servers, in such a way that a subset of agents communicates with one server and another unique subset of agents communicates with another server and the servers aggregate the data between each other. However, such a solution would not be applicable to the situation where there is only one server available.

BRIEF DESCRIPTION OF THE DRAWINGS

The present invention is illustrated by way of example and not limited in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, at least one agent performs a throttling process by limiting the amount of system management commands or messages (hereinafter simply referred to as messages) sent to a system management server (hereinafter simply referred to as server) in a managed manner. In one aspect of the invention, an agent within a network node limits the amount of messages to be sent to the server before entering a predetermined time period (e.g., a quiet period) during which no messages (e.g., throttleable messages) would be sent to the server. As a result, the amount of messages to be sent to the server is limited, such that the server would not be flooded. This technique is referred to herein as a "send throttling" technique throughout this application.

According to another aspect of the invention, a network node maintains a message queue to buffer the messages received from the software or other components of the network node. An agent is configured to limit the amount of messages to be dequeued from the message queue within a predetermined time period (e.g., a burst period). As result, a resource usage (e.g., CPU usage) of the network node may be reduced. This technique is referred to herein as a "queue throttling" technique throughout this application.

According to a further aspect of the invention, the server and each network node managed may communicate with each other to configure an individual throughput of messages (e.g., throttling policy) exchanged between the server and each managed client. Note that some or all of the above techniques may be combined to achieve managing message flows between the server and a managed network node.

Figure 1:
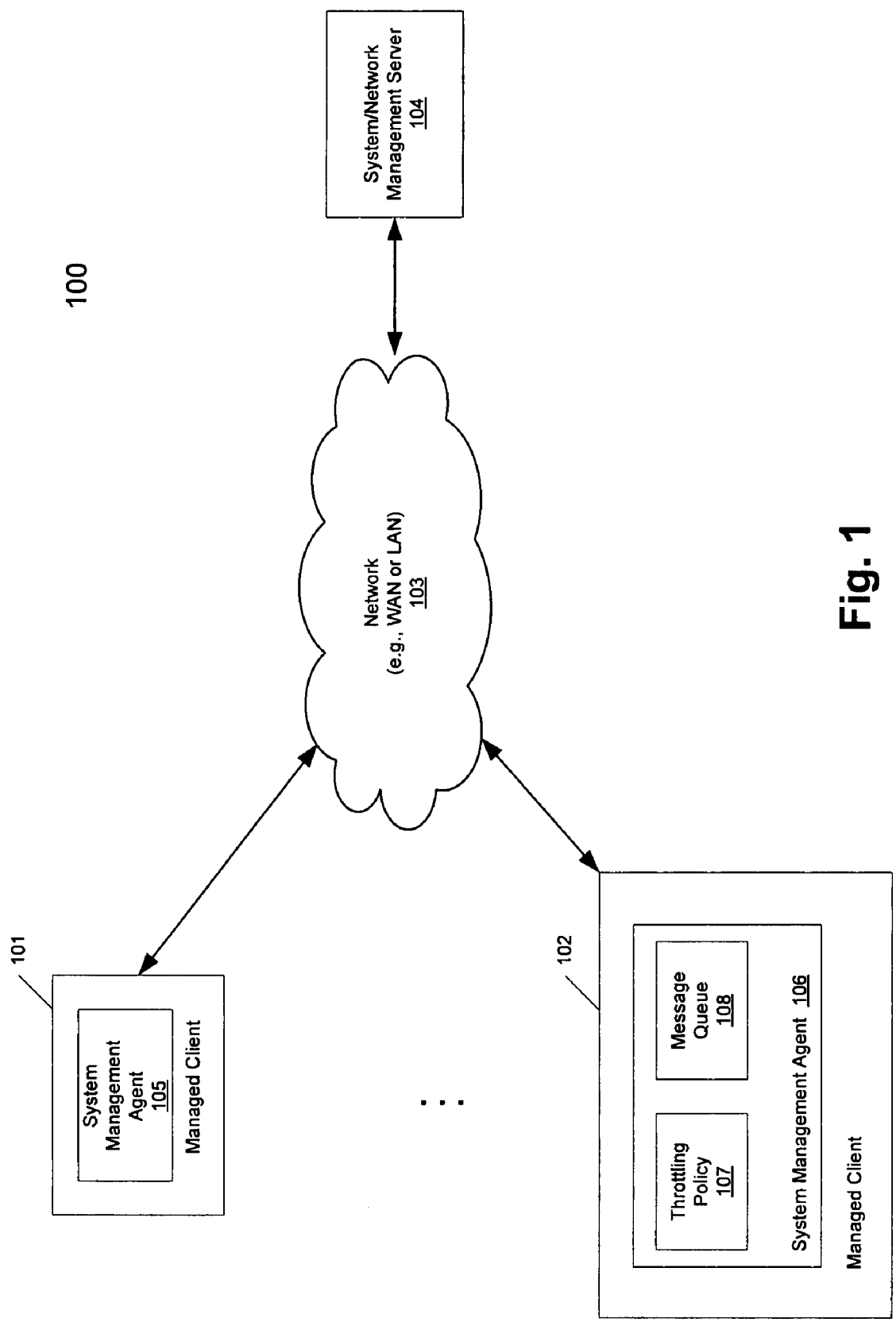
FIG. 1 is a block diagram illustrating a network configuration according to one embodiment of the invention.

FIG. 1 is a block diagram illustrating a network configuration according to one embodiment of the invention. Referring to FIG. 1, according to one embodiment, network configuration 100 includes, but is not limited to, one or more network nodes (e.g., managed clients) 101-102 that are communicatively coupled to a system management server 104 over a network 103. Network nodes 101-102 may communicate system management messages with server 104 via a variety of communication protocols, such as, for example, SNMP (simple network management protocol) or ICMP (Internet control message protocol), etc.

Network nodes 101-102 and server 104 may be computing device capable of being coupled to the network, such as, for example, an individual computer or workstation, router, gateway, or server. Network 103 may be a wide area network (e.g., Internet) or a local area network (e.g., Intranet or a peer-to-peer network). The network connections may be wired, wireless, or a combination of both wired and wireless. Network 103 may include multiple sub-networks.

In addition, each of the network nodes 101-102, as managed clients, includes a system management agent 105-106. In one embodiment, at least one of the managed clients 101-102 maintains a throttling policy 107 for throttling system management messages to be sent to system management server 104. In addition, one or more managed clients 101-102 may include a message queue 108 to temporarily buffer the messages, for example, using "send throttling", "queue throttling" techniques, or a combination of both, such that server 104 would not be flooded. These techniques will be described greater in details further below.

Figure 2:
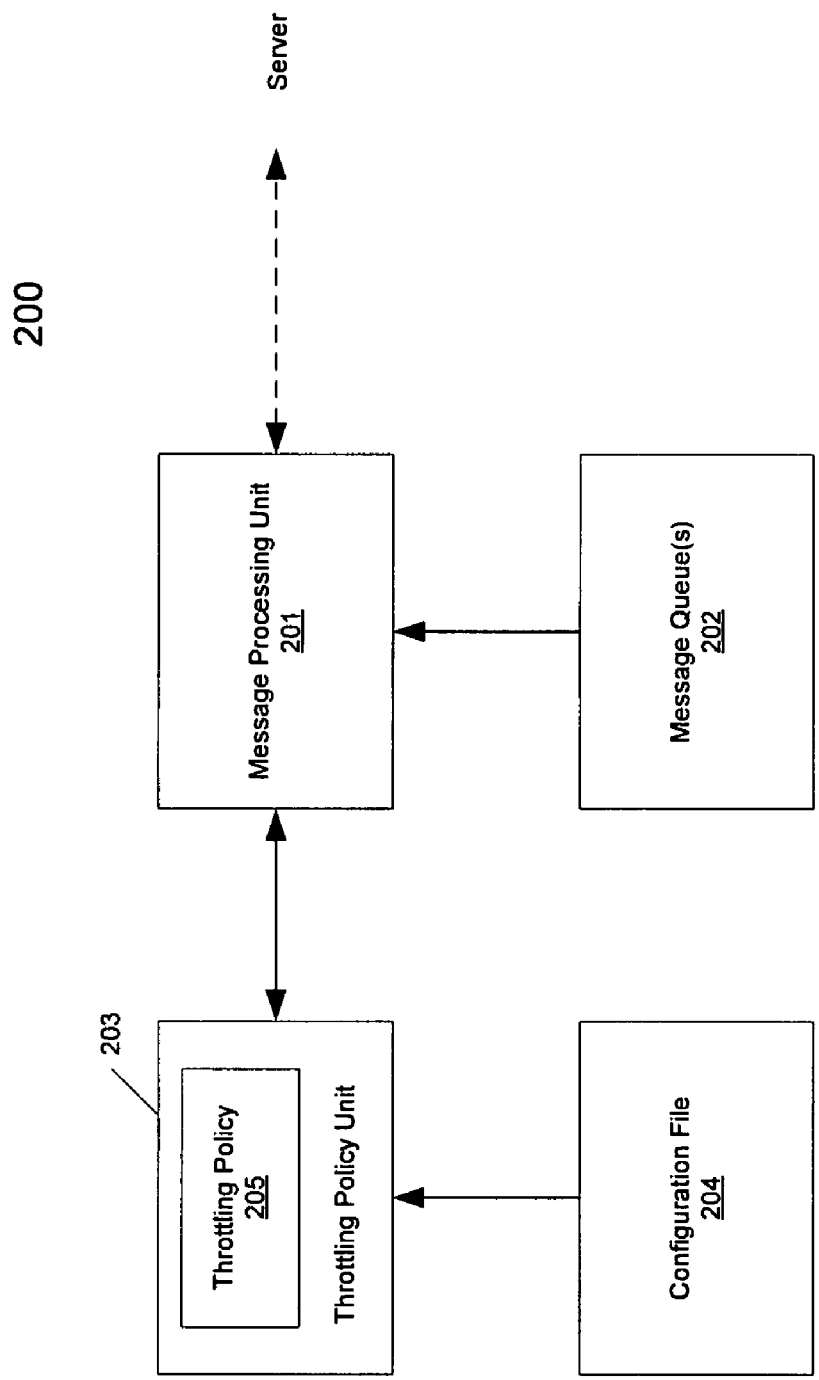
FIG. 2 is a block diagram illustrating an example of a system management agent according to one embodiment of the invention.

FIG. 2 is a block diagram illustrating an example of a system management agent according to one embodiment of the invention. For example, agent 200 may be implemented as part of any one of agents 105-106 of FIG. 1. Referring to FIG. 2, according to one embodiment, agent 200 includes, but is not limited to, a message processing unit 201 coupled to a message queue 202 and a throttling policy unit 203. Message queue 202 may be used to temporarily store management messages to be sent to a system management server (e.g., server 104 of FIG. 1). Throttling policy unit 203 is configured to maintain throttling policy 205 which is used by message processing unit 201 to throttle messages retrieved from message queue 202 and sent to the server, using certain throttling techniques set forth further below.

In one embodiment, throttling policy unit 203 accesses a configuration file associated with agent 200 to determine the throttling policy 205. Throttling policy 205 may be stored in a storage, volatile or non-volatile, such as, for example, memory or registry of an operating system (e.g., Windows™ operating system registry), etc. In one embodiment, configuration file 204 includes a variety of throttling parameters or attributes that governs how message processing unit 201 should throttle messages from messages queue 202 to be sent to the server. For example, in a particular embodiment, throttling parameters may include a maximum number of messages (e.g., maximum threshold) to be sent to the server before the agent 200 enters a predetermined period of time (e.g., a quiet period) during which no message should be sent. In another particular embodiment, throttling parameters may include a maximum number of messages (e.g., maximum threshold) that can be dequeued (e.g., retrieved or popped) from message queue within a predetermined period of time (e.g., a burst period).

Configuration file 204 may be read or processed during an initialization phase of agent 200 (e.g., during boot time or reset) or alternatively, it may be processed dynamically, for example, in response to an instruction received from a server or a user command, etc. Other throttling parameters or attributes may also be specified. Configuration file 204 may be implemented in a variety of formats, such as, for example, plain text, HTML (hypertext markup language), XML (extensible markup language), or a binary format, etc. Configuration file 204 may be stored in a clear form or encrypted form. Note that some or all of the components of agent 200 as shown in FIG. 2 may be implemented in hardware (circuitry, dedicated logic, etc.), software (such as is run on a general purpose computer system or a dedicated machine), or a combination of both. Other configuration may also be implemented.

Figure 3:
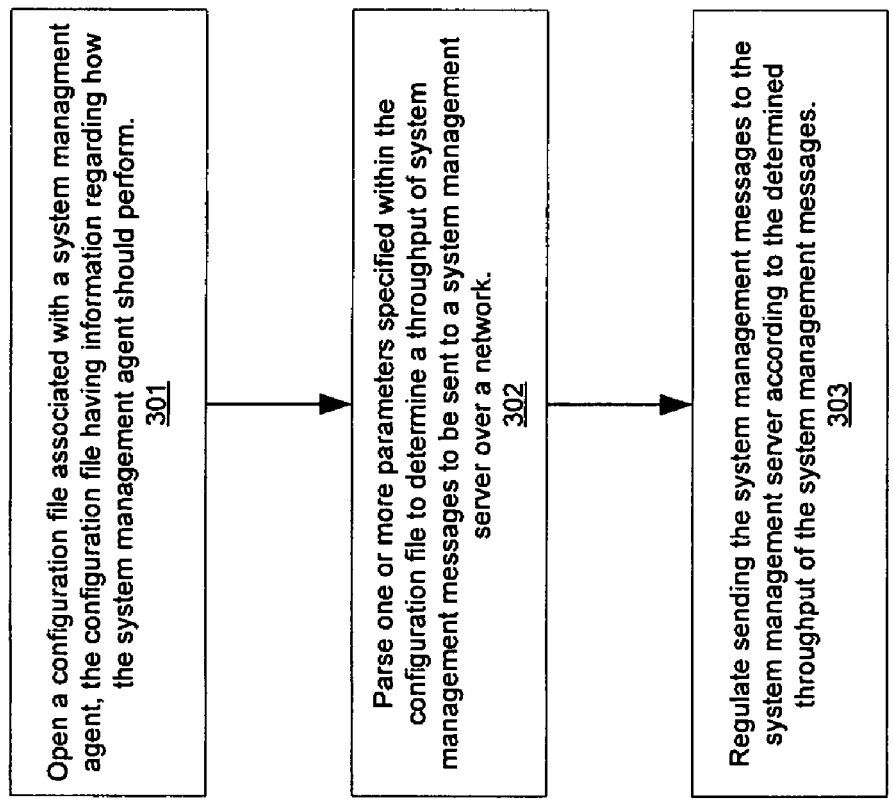
FIG. 3 is a flow diagram illustrating a process for handling system management messages according to one embodiment of the invention.

FIG. 3 is a flow diagram illustrating a process for handling system management messages according to one embodiment of the invention. Note that process 300 may be performed by processing logic which may include hardware (circuitry, dedicated logic, etc.), software (such as is run on a general purpose computer system or a dedicated machine), or a combination of both. For example, process 300 may be performed by agent 200 of FIG. 2. Referring to FIG. 3, at block 301, processing logic opens and reads one or more parameters or attributes of a configuration file associated with a system management agent (e.g., configuration file 204 of agent 200 of FIG. 2), where the parameters specify how the agent should handle the system management messages to be sent to a system management server. At block 302, processing logic parses those parameters to determine, as a part of a throttling policy, a throughput of system management messages to be sent to the server, such as, for example, a maximum number of messages to be sent to the server prior to entering a quiet period and/or a maximum number of messages to be dequeued from a message queue within a burst period, etc. At block 303, processing logic regulates the transmission of system management messages to the server according to the determined throttling policy. Other operations may also be performed.

Figure 4:
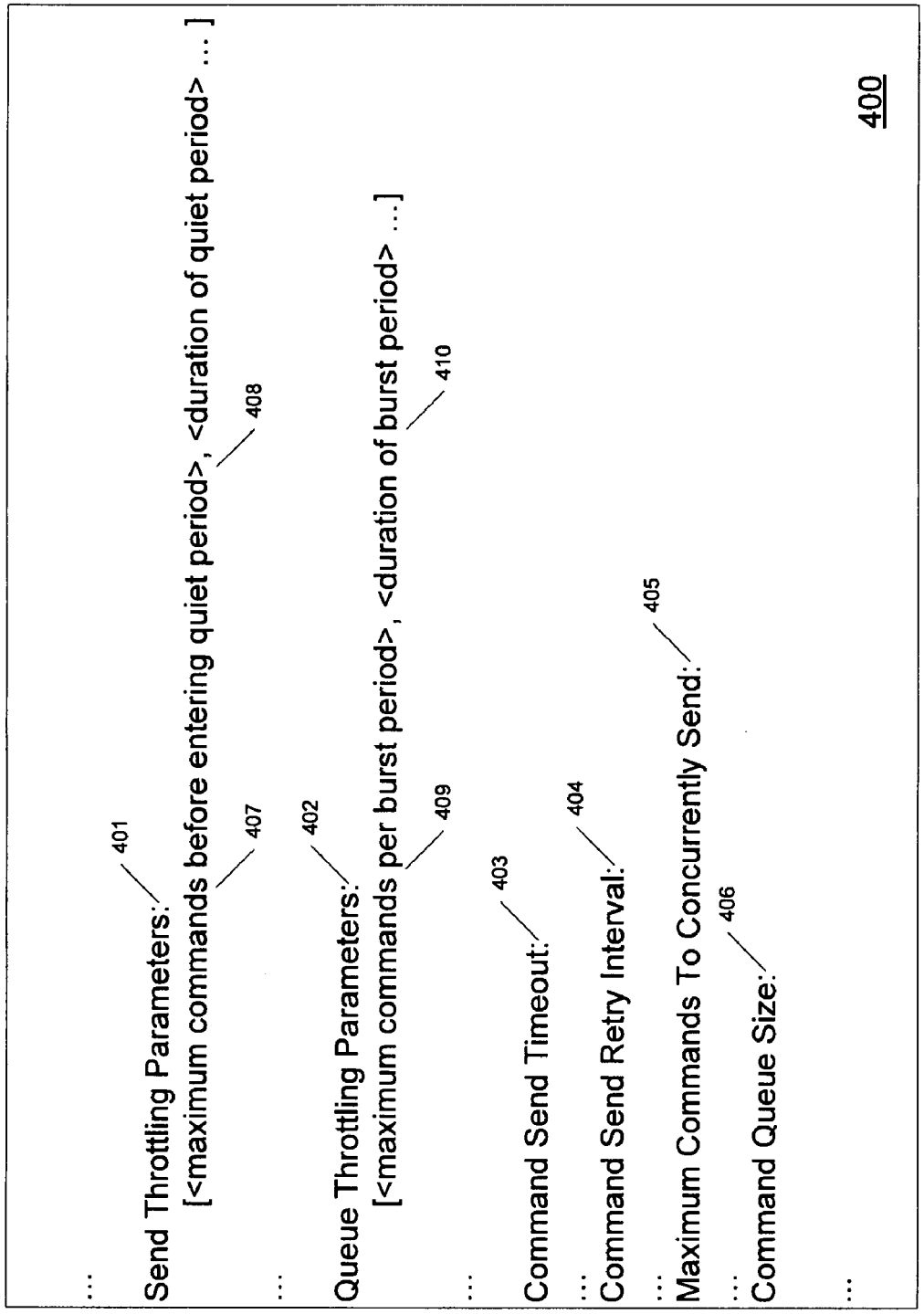
FIG. 4 is pseudo code illustrating an example of a configuration file according to one embodiment of the invention.

FIG. 4 is pseudo code illustrating an example of a configuration file according to one embodiment of the invention. For example, configuration file 400 may be implemented as part of configuration file 204 of FIG. 2. Referring to FIG. 4, configuration file 400 may include a variety of parameters or attributes 401-406, which may be used to configure a throttling policy such as throttling policy 205 of FIG. 2.

In one embodiment, send throttling parameters 401 may be used to configure a throttling policy related to a "send throttling" feature. Parameters 401 include a first parameter 407 specifying a maximum number of messages that can be sent to the server prior to entering a quiet period having a duration specified by parameter 408. If parameters 401 are defined, they enable send-throttling feature of the agent. When this feature is enabled, only a certain number of commands or messages can be sent before the agent enters a quiet period. During the quiet period, no throttleable commands are allowed to be sent to the server. Note that certain commands or messages may have a higher priority and thus, not be subjected to throttling processes. These commands or messages can still be sent during a quiet period. Also note that throughout this application, the terms of "commands" and "messages" are used interchangeably.

Also note that, throughout this application, whether a message or command is "throttleable" may be determined based on a specific network setting, server setting, individual setting of a network node, and/or a user configuration, etc. For example, a command or message may include a specific field (e.g., embedded in a header, tail, and/or body or payload) to indicate whether the respective message or command is throttleable. Alternatively, an agent may determine an individual command or message based on the type or category of the respective command or message. Other configurations may exist.

Sending commands can resume after the quiet period ends. Send throttling only affects those commands configured as "throttleable". These may include commands containing metric collection data (e.g., those commands that tend to be sent to the server very frequently and in large numbers). Any other commands may not be affected by the send-throttle. Send throttling assists in preventing message storms on the server, thus helping to avoid the server from getting flooded with incoming messages and preventing agent starvation (e.g., not locking out other agents from being able to talk to the server). The send-throttling parameters define both the maximum number of commands that can be sent and the length of the quiet period. For example, a preference value of [50:10000] may mean that after 50 throttleable commands have been sent, a quiet period should commence and last for 10,000 milliseconds. After that time expires, 50 more commands can be sent before the next quiet period begins.

Figure 5:
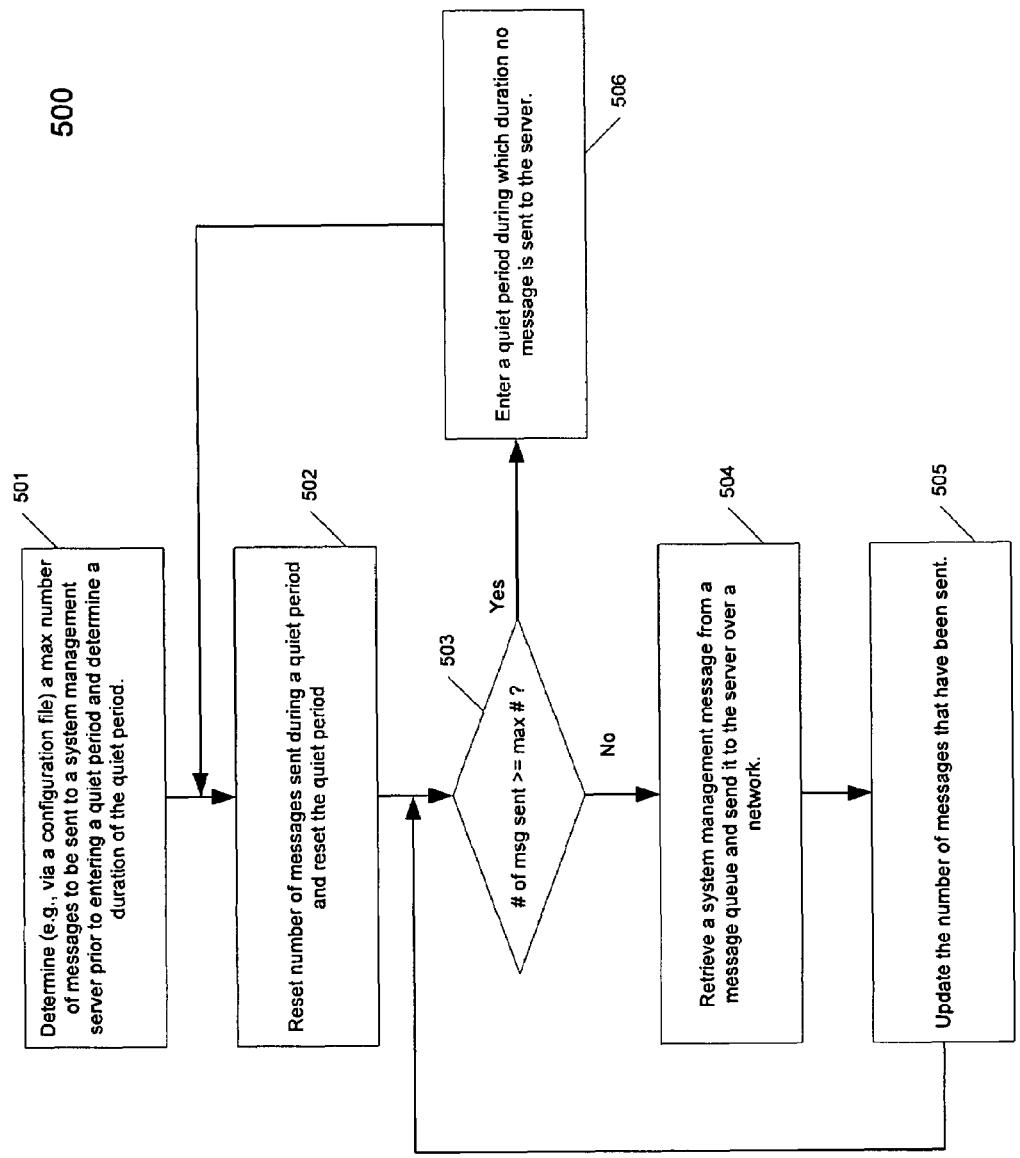
FIG. 5 is a flow diagram illustrating a process for handling system management messages using a send throttling technique according to one embodiment of the invention.

FIG. 5 is a flow diagram illustrating a process for handling system management messages using a send throttling technique according to one embodiment of the invention. Note that process 500 may be performed by processing logic which may include hardware (circuitry, dedicated logic, etc.), software (such as is run on a general purpose computer system or a dedicated machine), or a combination of both. For example, process 500 may be performed by agent 200 of FIG. 2.

Referring to FIG. 5, at block 501, processing logic determines a maximum number of messages to be sent to a system management server over a network before entering a quiet period (e.g., a predetermined period) and determines the duration of the quiet period. In one embodiment these parameters are read from a configuration file associated with a system management agent. At block 502, the number of messages to be sent and the duration of the quiet period are reset. These are typically done when a previous quiet period ends and new messages are about to be sent. At block 503, processing logic determine whether the number of messages sent is greater than or equal to the maximum number of messages determined at block 501. If so, at block 506, processing logic enters a next quiet period during which no messages (e.g., throttleable messages) will be sent to the server. Otherwise, at block 504, a next message is sent to the server over the network. Optionally, the next message may be retrieved from a message queue to temporarily buffer the pending messages. After sending the message, at block 505, the number of sent messages have been sent is updated, and the above operations repeat. Other operations may also be performed.

Referring back to FIG. 4, in one embodiment, queue throttling parameters 402 may be used to configure a throttling policy related to a "queue throttling" feature. Parameters 402 include a first parameter 409 specifying a maximum number of messages that can be dequeued from a message queue within a burst period having a duration specified by parameter 410. If these parameters are defined, it enables queue throttling feature of a system management agent. These parameters are used to limit the amount of commands that can be dequeued from a message queue in a given amount of time, also referred to as a burst period. If more commands are attempted to be dequeued during the burst period than allowed, those dequeue requests will be blocked until the next burst period begins.

For example, if parameter 402 is set to [50:10000], it means that at most 50 commands can be dequeued from the message queue in any 10,000 millisecond interval. If, during a burst period, a $51^{st}$ command attempts to be dequeued, that dequeue request may be blocked until the burst period finishes (at which time a new burst period begins and the dequeue request becomes the first of the next 50 allowed dequeue requests). The purpose of queue throttling is not so much to limit the amount of requests being sent to the server (although this does have that side-effect), it really is to prohibit the agent from spinning resources (e.g., CPU cycles) too much as it attempts to dequeue and send commands as fast as it can. If an agent is using too many resources, the agent can throttle the queue thus reducing the amount of resources required for the agent to send its commands. Note that if the agent enables queue-throttling feature, it has to take care of ensuring the queue size of the message queue is large enough. Since the agent is limiting the amount of commands that can be dequeued in a specific amount of time, it needs to make sure it has enough space in the message queue to support an extra amount of commands that get queue up. In one embodiment, a message queue size can be specified via command queue size parameter 406.

Figure 6:
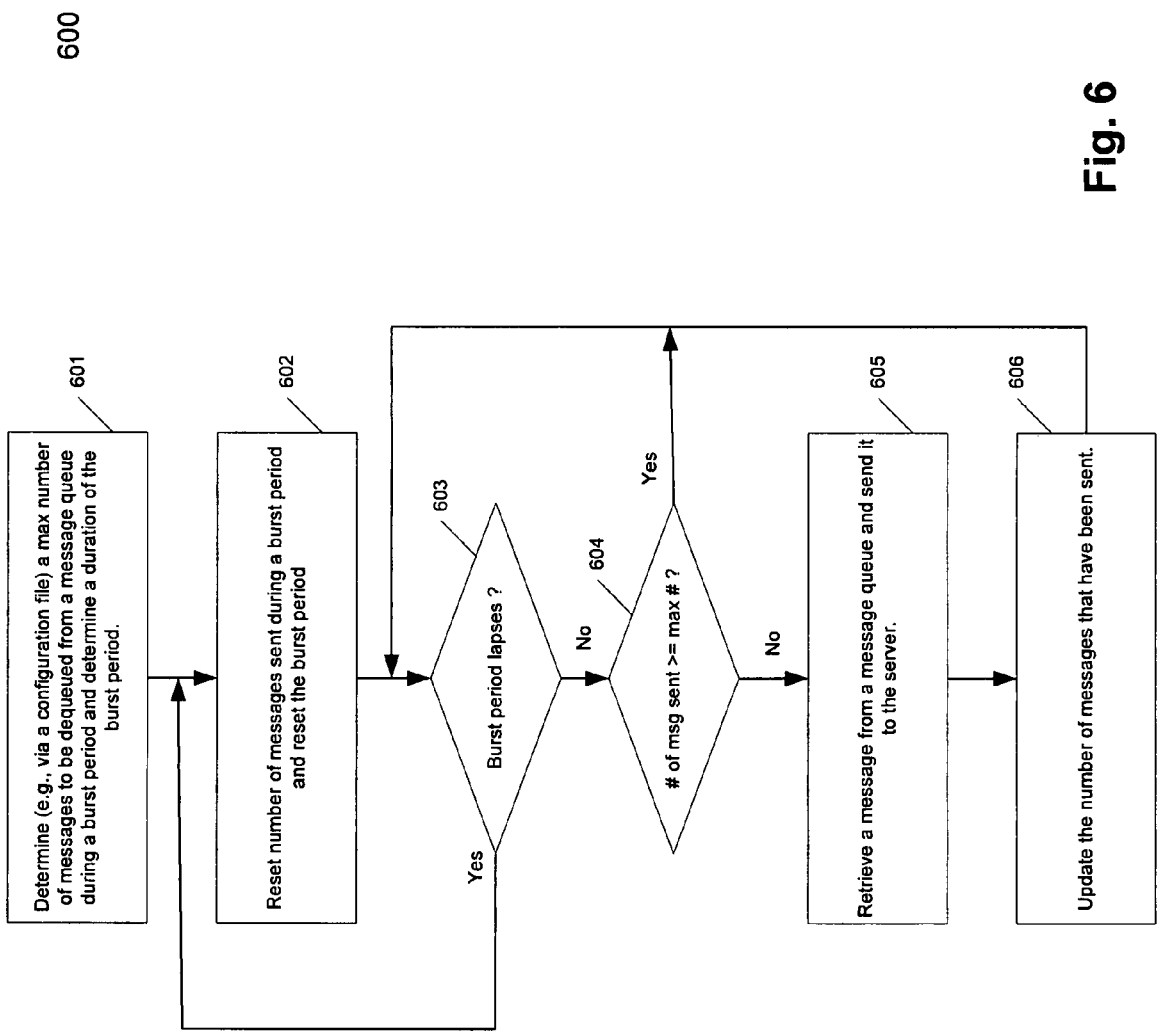
FIG. 6 is a flow diagram illustrating a process for handling system management messages using a queue throttling technique according to one embodiment of the invention.

FIG. 6 is a flow diagram illustrating a process for handling system management messages using a queue throttling technique according to one embodiment of the invention. Note that process 600 may be performed by processing logic which may include hardware (circuitry, dedicated logic, etc.), software (such as is run on a general purpose computer system or a dedicated machine), or a combination of both. For example, process 600 may be performed by agent 200 of FIG. 2.

Referring to FIG. 6, at block 601, processing logic determines a maximum number of messages to be dequeued from a message queue within a burst period (e.g., a predetermined period) and determines the duration of the burst period. In one embodiment these parameters are read from a configuration file associated with a system management agent. At block 502, the number of messages to be dequeued and the duration of the burst period are reset. These are typically done when a previous burst period ends and new messages are about to be dequeued. At block 603, processing logic determines whether the current burst period ends. If so, a new burst period will start. Otherwise, at block 604, processing logic determines whether the number of messages that have been dequeued is greater than or equal to the maximum number determined at block 601. If so, no more messages (e.g., throttleable messages) will be dequeued from the message queue for the remaining of the current burst period. Otherwise, at block 605, a next message is dequeued from the message queue and at block 606, the number of messages dequeued is updated. Other operations may also be performed.

Referring back to FIG. 4, configuration file 400 may further include additional parameters that may have side effects on the throttling processes. According to certain embodiments of the invention, command send timeout parameter 403 may be used to configure the amount of time the agent will wait for the server to reply with a response from a command before that command will be aborted. The longer this time is, the less of a chance the agent will abort a command that otherwise would have succeeded (e.g. if the server just needs a lot of time to process the particular command). However, the longer this time is, the more messages have to be queued up and waiting before being sent to the server.

In one embodiment, command send retry interval parameter 404 may be used to configure the amount of time the agent will wait before attempting to retry a command. Only those commands that are flagged for guaranteed delivery (e.g., non-throttleable) will be retried. Non-guaranteed commands (e.g., volatile commands) will not be retried and thus this setting will have no effect.

In one embodiment, maximum commands to concurrently send parameter 405 may be used to configure the number of messages the agent can send at any one time. The larger the number, the more messages the agent can dequeue (thus freeing up space in the queue for more messages to come in). However, the higher this number is, the more messages will get sent to the server at the same time and may require the agent to use more local resources such as, for example, CPU cycles.

In one embodiment, command queue size parameter 406 may be used to define the maximum number of commands the agent can queue up for sending to the server. The larger the number, the more memory the agent will be able to use up. In a particular embodiment, setting this to zero effectively sets the queue to be unbounded. It should be noted that if parameter 406 is set to zero and the server is down for a long period of time, the agent may run out of memory if it attempts to queue up more commands than it has memory for.

As described above, a system management agent has several configuration preferences that define its client-side commands sender—they limit how many resources it can use and how "fast" it can perform some functions (e.g., throttling). These configuration preferences have two main purposes: 1) to help limit the amount of resources the agent is able to claim for itself and 2) to help avoid flooding the server with large amount of commands which could put too-heavy a load on the server and/or starve other agents from being able to communicate with the Server. The above configuration preferences define the settings that enable the agent to throttle its outbound messages. Most of these settings may be configured in conjunction with other settings.

While these do work independently, their effects are usually determined not by their own value but also by related values. For example, a queue size should be set to a larger number if the command timeout is lengthened. This is because if commands are given more time to complete, then more commands will be in the queue waiting to be sent. But, if the max-concurrent is raised, this would allow more commands to be dequeued at any one time, so an increase in the queue-size may not be needed. As it can be seen, all of those preferences set an independent parameter within the agent, but their effects on the agent's behavior as a whole is dependent on the other agent's preferences.

According to one embodiment, the "send throttling" technique and the "queue throttling" technique may have side effects on each other. Note that an agent may enable none, one, or both features, for example, by setting proper parameters of a configuration file, for processing the system management messages to be sent to a system management server.

Again, as described above, the main purpose of queue throttling was not to prevent server flooding—that is a secondary purpose. The main purpose was to limit the amount of resources (e.g., CPU cycles) the agent uses. Typically, dequeuing messages is highly CPU intensive and sending messages to the server is highly I/O intensive. If the agent was free to dequeue messages as fast as it could, the agent might eat up most of the resources such as CPU time. This could happen if the agent all of a sudden enters some states that require the agent to send hundreds of messages to the server for a sustained period of time. In effect, the agent would starve other processes running on that computer. Queue throttling helps prevent this. But at the same time, because of the effect queue throttling has, it also helps reduce amount of messages sent to the server, because the only way to send messages to the server is to pick (e.g., dequeue) messages off the queue, and if the agent limits the number of messages coming off the queue, it can limit the messages going to the server.

Figure 7:
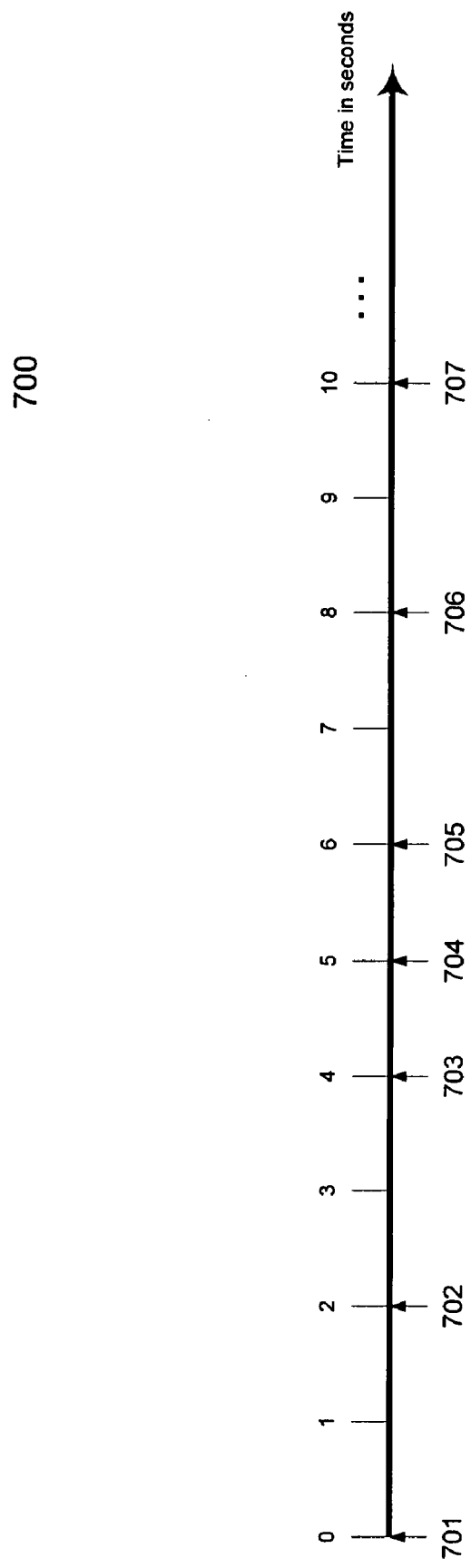
FIG. 7 is a timeline diagram illustrating impacts among multiple throttling techniques according to one embodiment of the invention.

FIG. 7 is a timeline diagram illustrating impacts among multiple throttling techniques according to one embodiment of the invention. For the purposes of illustration, it is assumed that the queue throttling parameter is set to [10:2000], in which case, there are no more than 10 messages that can be dequeued for every 2 seconds (e.g., a burst period of 2 seconds). If the agent tries to dequeue 20 messages, the agent will only be able to dequeue 10 messages immediately, then after 2 seconds of a burst period elapse, the agent can grab the other 10 messages.

For the purposes of illustration, it is assumed that the send throttling parameter is set to [15:3000], in which case, after sending every 15$^{th}$ message, the agent enters a quiet period lasting for 3 seconds. After that, the agent can start sending again up to 15 messages. Agent then enters another quiet period which lasts another 3 seconds, then the cycle repeats. For the purposes of illustration, it is assumed that the agent will attempt to dequeue and send messages as fast as it can. Assuming that the message queue currently contains 100 messages. For the sake of simplicity, it is assumed that the amount of time the agent takes to dequeue a message and to send a message is relatively small.

Referring to FIG. 7, at time 701, agent dequeues 10 messages (e.g., the most it can do due to queue throttling parameters). The agent then sends those 10 messages. Note that it has not crossed the 15 threshold set by send throttling parameters above. At time 702 (e.g., the 2 second time mark), the queue throttling burst period resets and the agent can now dequeue another 10 messages. But the agent can only send 5 of them, at which point it has reached the send throttle quiet period. As a result, the agent must sleep for 3 seconds which is the length of the quiet period. At this point, the total number of messages sent is 15.

At time 703 (e.g., the 4 second time mark), even though the agent cannot send anything, a new burst period has begun so the agent can now dequeue another 10 messages from the message queue. At this point, the agent has got 15 messages waiting to be sent, including 5 messages that have been dequeued but not able to be sent at time 702 and now these new 10 messages. Thus, at this point, the total number of messages that have been sent is still 15.

At time 704 (e.g., the 5 second time mark), the quiet period is over. The agent can now send messages again. At this point, the agent has 15 messages waiting to be sent, so the agent can send all of them immediately. But the agent again reached the send throttle limit, so the agent immediately enters another quiet period. At this point, the total messages that have been sent reach 30.

At time 705 (e.g., the 6 second time mark), a new burst period has begun and the agent will dequeue another 10 messages from the message queue. These 10 messages cannot be sent because the agent is still in the quiet period. As a result, the agent now has 10 messages waiting to be sent. At this point, the total number of messages that have been sent is still 30.

At time 706 (e.g., the 8 second time mark), the quiet period is over and also a new burst period has begun. Thus, the agent can immediately send the 10 messages waiting from time 705, plus the agent can dequeue 10 more messages. However, the agent can only send 5 of them because it has now reached the 15 send throttle max again. So, the agent now has 5 messages waiting to be sent. At this point, the total number of messages that have been sent is 45.

At time 707 (e.g., the 10 second time mark), the agent is still in a quiet period, but a new burst period has started. Thus, the agent can now dequeue 10 more messages from the message queue. Adding that to the 5 messages already waiting, the agent got 15 messages waiting to be sent. At this point, the total number of messages that have been sent is still 45, similar to the situation at time 703.

As described above, if only queue throttling were enabled (e.g., no send throttling), the agent is able to send 10 messages every 2 seconds, a total of 50 messages at time 706. If only send throttling were enabled, the agent is able to send 45 messages at time 705. Both of these situations can send more messages than when both throttling features are enabled (e.g., 45 messages sent at time 706 and only 30 messages sent at time 705). As a result, queue throttling has both the ability to limit the amount of local resources (e.g., CPU cycles) used by the agent as well as slowing down the agent even more so than with send throttling alone. A user can therefore configure both queue and send throttling to finely tune the agent—more finely tuned than with only queue throttling or only send throttling. Other configurations may exist.

Figure 8:
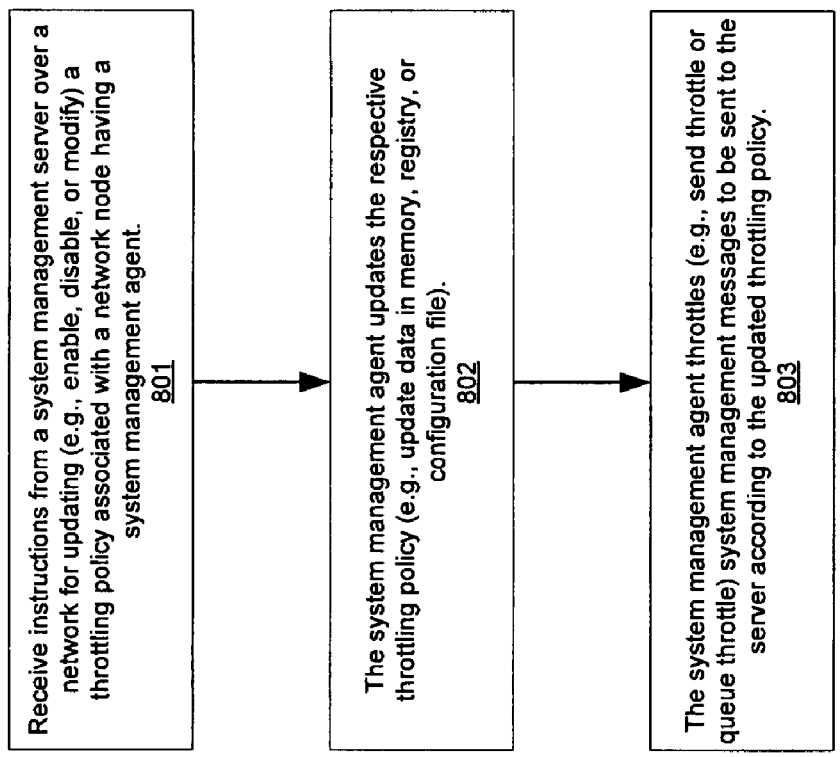
FIG. 8 is a flow diagram illustrating a process for handling system management messages according to another embodiment of the invention.

According to certain embodiments of the invention, a system management server and a system management agent may communicate with each other to configure (e.g., dynamically) the throttling policy. FIG. 8 is a flow diagram illustrating a process for handling system management messages according to another embodiment of the invention. Note that process 800 may be performed by processing logic which may include hardware (circuitry, dedicated logic, etc.), software (such as is run on a general purpose computer system or a dedicated machine), or a combination of both. For example, process 800 may be performed by agent 200 of FIG. 2. Referring to FIG. 8, at block 801, processing logic receives an instruction from a system management server for updating a throttling policy of a network node having a system management agent. In one embodiment, the server may instruct the agent to enable or disable the throttling feature of the network node. Alternatively, the server may instruct the agent to modify (e.g., slow down or speed up transmitting messages) the throttling processes.

For example, initially, only a few network nodes or devices are coupled to the network. As result, the server can handle all of the messages received from the online network nodes without having the network nodes to throttle the messages. Therefore, the server may instruct some or all the network nodes to disable the throttling feature. Over time, as the number of network nodes online increases, the server is flooded with the system management messages. In this situation, the server may instruct some or all of the network nodes to enable the throttling feature. Alternatively, the server may instruct some or all the network nodes to configure or modify certain thresholds (e.g., send throttling threshold or queue throttling threshold) of the throttling feature.

At block 802, the processing logic updates the throttling policy according to the instructions received from the server and at block 803, the agent throttles further messages to be sent to the server according to various techniques described above. Other operations may also be performed.

Figure 9:
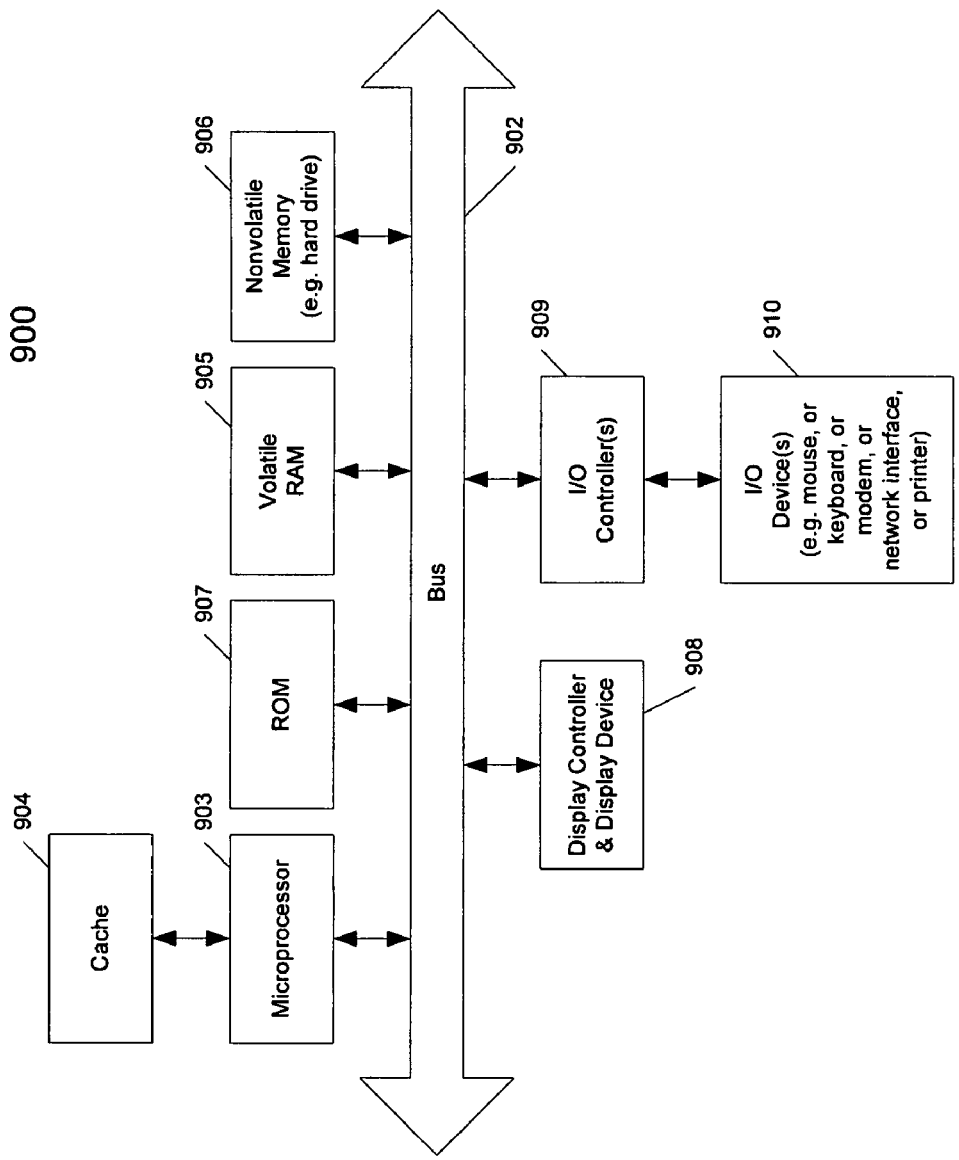
FIG. 9 is a block diagram of a digital processing system, which may be used with one embodiment of the invention.

FIG. 9 is a block diagram of a digital processing system, which may be used with one embodiment of the invention. For example, the system 900 may be used as a client and/or a server as described above with respect to FIG. 1. Note that while FIG. 9 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention.

As shown in FIG. 9, the system 900, which is a form of a data processing system, includes a bus or interconnect 902 which is coupled to one or more microprocessors 903 and a ROM 907, a volatile RAM 905, and a non-volatile memory 906. The microprocessor 903 is coupled to cache memory 904 as shown in the example of FIG. 9. Processor 903 may be, for example, a PowerPC microprocessor or an Intel compatible processor. Alternatively, processor 903 may be a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), or hybrid architecture, although any appropriate processor may be used.

The bus 902 interconnects these various components together and also interconnects these components 903, 907, 905, and 906 to a display controller and display device 908, as well as to input/output (I/O) devices 910, which may be mice, keyboards, modems, network interfaces, printers, and other devices which are well-known in the art.

Typically, the input/output devices 910 are coupled to the system through input/output controllers 909. The volatile RAM 905 is typically implemented as dynamic RAM (DRAM) which requires power continuously in order to refresh or maintain the data in the memory. The non-volatile memory 906 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 9 shows that the non-volatile memory is a local device coupled directly to the rest of the components in the data processing system, embodiments of the present invention may utilize a non-volatile memory which is remote from the system; such as, a network storage device which is coupled to the data processing system through a network interface such as a modem or Ethernet interface. The bus 902 may include one or more buses connected to each other through various bridges, controllers, and/or adapters, as is well-known in the art. In one embodiment, the I/O controller 909 includes a USB (Universal Serial Bus) adapter for controlling USB peripherals. Alternatively, I/O controller 909 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for processing system management messages, the method comprising:
    determining a throttling policy associated with a network node for throttling system management messages to be sent to a system management server over a network, the throttling policy including
        a queue throttling policy defining a first maximum number of system management messages that can be dequeued from a message queue within a burst period, and
        a send throttling policy defining a second maximum number of the dequeued system management messages that can be sent to the system management server before entering a quiet period during which no system management messages are sent; and
    throttling the system management messages sent to the system management server according to the queue throttling policy and the send throttling policy independently and concurrently.

2. The method of claim 1, wherein determining the throttling policy comprises:
    determining a duration of the quiet period.

3. The method of claim 2, further comprising entering the quiet period after sending up to the second maximum number of system management messages to the system management server.

4. The method of claim 3, further comprising resuming sending further system management messages to the system management server up to the second maximum number of system management messages after the quiet period lapses.

5. The method of claim 1, wherein determining the throttling policy comprises:
    determining a duration of the burst period.

6. The method of claim 5, further comprising:
    for each burst period, dequeuing up to the first maximum number of system management messages from the message queue; and
    transmitting the dequeued system management messages to the system management server over the network.

7. The method of claim 6, wherein the dequeuing is suspended once up to the first maximum number of system management messages have been dequeued from the message queue until a current burst period lapses.

8. The method of claim 1, further comprising:
    in response to an instruction received from the system management server indicating one of disabling, enabling, and modifying the throttling policy, updating the throttling policy; and
    throttling further system management messages according to the updated throttling policy.

9. The method of claim 1, further comprising:
    identifying a particular system management message that satisfies a predetermined condition; and
    transmitting the identified system management message to the system management server without throttling.

10. The method of claim 1, further comprising:
    dequeuing by dequeuing logic system management messages from the message queue according to the queue throttling policy; and
    independently and concurrently sending by sending logic the dequeued system management messages according to the send throttling policy, wherein a system management message is dequeued from the message queue and sent to the system management server only when the dequeuing logic is within a burst period and the sending logic has not entered a quiet period at the point in time.

11. A computer-readable storage medium having instructions, which when executed by a processor, cause the processor to perform a method for processing system management messages, the method comprising:
    determining a throttling policy associated with a network node for throttling system management messages to be sent to a system management server over a network, the throttling policy including
        a queue throttling policy defining a first maximum number of system management messages that can be dequeued from a message queue within a burst period, and
        a send throttling policy defining a second maximum number of the dequeued system management messages that can be sent to the system management server before entering a quiet period during which no system management messages are sent; and throttling the system management messages sent to the system management server according to the queue throttling policy and the send throttling policy independently and concurrently.

12. The computer-readable storage medium of claim 11, wherein determining the throttling policy comprises:
   determining a duration of the quiet period.

13. The computer-readable storage medium of claim 12, wherein the method further comprises entering the quiet period after sending up to the second maximum number of system management messages to the system management server.

14. The computer-readable storage medium of claim 13, wherein the method further comprises resuming sending further system management messages to the system management server up to the second maximum number of system management messages after the quiet period lapses.

15. The computer-readable storage medium of claim 11, wherein determining the throttling policy comprises:
   determining a duration of the burst period.

16. The computer-readable storage medium of claim 15, wherein the method further comprises:
   for each burst period, dequeuing up to the first maximum number of system management messages from the message queue; and
   transmitting the dequeued system management messages to the system management server over the network.

17. The computer-readable storage medium of claim 16, wherein the dequeuing is suspended once up to the first maximum number of system management messages have been dequeued from the message queue until a current burst period lapses.

18. The computer-readable storage medium of claim 11, wherein the method further comprises:
   in response to an instruction received from the system management server indicating one of disabling, enabling, and modifying the throttling policy, updating the throttling policy; and
   throttling further system management messages according to the updated throttling policy.

19. The computer-readable storage medium of claim 11, wherein the method further comprises:
   identifying a particular system management message that satisfies a predetermined condition; and
   transmitting the identified system management message to the system management server without throttling.

20. The computer-readable storage medium of claim 11, wherein the method further comprises:
   dequeuing by dequeuing logic system management messages from the message queue according to the queue throttling policy; and
   independently and concurrently sending by sending logic the dequeued system management messages according to the send throttling policy, wherein a system management message is dequeued from the message queue and sent to the system management server only when the dequeuing logic is within a burst period and the sending logic has not entered a quiet period at the point in time.

21. A network node, comprising:
   a throttling policy unit to determine a throttling policy associated with the network node for throttling system management messages to be sent to a system management server over a network, the throttling policy including
      a queue throttling policy defining a first maximum number of system management messages that can be dequeued from a message queue within a burst period, and
      a send throttling policy defining a second maximum number of the dequeued system management messages that can be sent to the system management server before entering a quiet period during which no system management messages are sent; and
   a message processing unit coupled to the throttling policy unit to throttle the system management messages sent to the system management server according to the queue throttling policy and the send throttling policy independently and concurrently.

22. The network node of claim 21, further comprising a message queue coupled to the message processing unit to buffer the system management messages, wherein the message processing unit is configured to dequeue the system management messages from the message queue and to send the dequeued system management messages to the system management server.

* * * * *